US006928470B1

(12) United States Patent
Hamlin

(10) Patent No.: US 6,928,470 B1
(45) Date of Patent: *Aug. 9, 2005

(54) TRANSFERRING SCHEDULING DATA FROM A PLURALITY OF DISK STORAGE DEVICES TO A NETWORK SWITCH BEFORE TRANSFERRING DATA ASSOCIATED WITH SCHEDULED REQUESTS BETWEEN THE NETWORK SWITCH AND A PLURALITY OF HOST INITIATORS

(75) Inventor: Christopher L. Hamlin, Los Gatos, CA (US)

(73) Assignee: Western Digital Ventures, Inc., Lake Forest, CA (US)

(*) Notice: Subject to any disclaimer, the term of this patent is extended or adjusted under 35 U.S.C. 154(b) by 700 days.

This patent is subject to a terminal disclaimer.

(21) Appl. No.: 09/628,582

(22) Filed: Jul. 31, 2000

(51) Int. Cl.$^7$ .................. G06F 15/173; G06F 12/00
(52) U.S. Cl. .................. 709/223; 709/240; 711/114; 711/151
(58) Field of Search .............. 711/114, 151; 709/240, 709/101, 238; 370/235

(56) References Cited

U.S. PATENT DOCUMENTS

| | | |
|---|---|---|
| 5,157,654 A | 10/1992 | Cisneros |
| 5,291,482 A | 3/1994 | McHarg et al. |
| 5,297,262 A | 3/1994 | Cox et al. |
| 5,521,928 A | 5/1996 | Worsley et al. |
| 5,566,169 A | 10/1996 | Rangan et al. |

(Continued)

OTHER PUBLICATIONS

Aaron Brown, "The UC Berkeley ISTORE Project: Bringing Availability, Maintainability, and Evolutionary Growth to Storage-Based Clusters", http://iram.CS.Berkeley.EDU/istore/talks/lucnet-jan00/sld001.htm, Jan. 19th, 2000.

Primary Examiner—Hosain Alam
Assistant Examiner—Kevin Bates
(74) Attorney, Agent, or Firm—Milad G. Shara, Esq.; Howard H. Sheerin, Esq.

(57) ABSTRACT

A network switch is disclosed for resolving requests from a plurality of host initiators by scheduling access to a plurality of disk storage devices. The network switch comprises a switched fabric comprising a plurality of switching elements. Each switching element comprises a plurality of bi-directional switched fabric ports, and a control input connected to receive switch control data for selectively configuring the switching element in order to interconnect the bi-directional switched fabric ports. The network switch further comprises a memory for storing a routing and scheduling program, and a microprocessor, responsive to the requests, for executing the steps of the routing and scheduling program to generate the switch control data to transmit scheduled requests through the bi-directional switched fabric ports. At least one of the plurality of switching elements comprises a disk storage interface for connecting to a selected one of the disk storage devices. The microprocessor schedules access to the plurality of disk storage devices through the disk storage interface. The disk storage interface receives scheduling data from the selected one of the storage devices, and the memory stores the scheduling data received via the bi-directional switched fabric ports of a selected number of the switching elements. The scheduling data is processed according to a priority such that the selected switching elements transfer the scheduling data through the bi-directional switched fabric ports before transferring data associated with the scheduled requests.

9 Claims, 5 Drawing Sheets

U.S. PATENT DOCUMENTS

| | | | |
|---|---|---|---|
| 5,787,482 A * | 7/1998 | Chen et al. | 711/158 |
| 5,854,941 A * | 12/1998 | Ballard et al. | 710/5 |
| 5,862,403 A * | 1/1999 | Kanai et al. | 710/6 |
| 5,890,202 A * | 3/1999 | Tanaka | 711/111 |
| 5,996,014 A * | 11/1999 | Uchihori et al. | 709/226 |
| 6,055,618 A * | 4/2000 | Thorson | 712/11 |
| 6,148,414 A * | 11/2000 | Brown et al. | 714/9 |
| 6,381,647 B1 * | 4/2002 | Darnell et al. | 709/232 |
| 6,421,711 B1 * | 7/2002 | Blumenau et al. | 709/213 |
| 6,496,899 B1 * | 12/2002 | DeMoney | 711/112 |
| 6,545,978 B1 * | 4/2003 | Sakurai | 370/236.2 |
| 6,603,625 B1 * | 8/2003 | Hospodor et al. | 360/73.02 |
| 6,654,195 B1 * | 11/2003 | Frank et al. | 360/75 |
| 6,691,198 B1 * | 2/2004 | Hamlin | 710/305 |
| 6,697,914 B1 * | 2/2004 | Hospodor et al. | 711/112 |

* cited by examiner

TRANSFERRING SCHEDULING DATA FROM A PLURALITY OF DISK STORAGE DEVICES TO A NETWORK SWITCH BEFORE TRANSFERRING DATA ASSOCIATED WITH SCHEDULED REQUESTS BETWEEN THE NETWORK SWITCH AND A PLURALITY OF HOST INITIATORS

BACKGROUND OF THE INVENTION

1. Field of the Invention

The present invention relates to network systems. More particularly, the present invention relates to transferring scheduling data from a plurality of disk storage devices to a network switch before transferring data associated with scheduled requests between the network switch and a plurality of host initiators.

2. Description of the Prior Art

Conventional disk drive storage systems typically employ a scheduling algorithm in order to optimize data throughput. For example, a scheduling algorithm may evaluate and prioritize access requests rather than service the requests on a "first come first serve" basis. The scheduling priority is typically based on certain temporal parameters of the disk drive, such as the radial position of the head with respect to the disk. A scheduling algorithm may, for example, service all of the access requests from the outer to inner diameter tracks before servicing access requests from the inner to outer diameter tracks, similar to an elevator in a building servicing all of the down requests before servicing up requests. This algorithm is appropriately referred to as the "elevator" algorithm.

It is known to use temporal parameters of a disk drive (e.g., the radial or circumferential position of the head) in order to perform the scheduling operations; however, these types of scheduling algorithms have in the past been implemented by a disk controller which has direct access to the temporal parameters. For example, U.S. Pat. No. 5,390,313 discloses a disk drive comprising a disk controller for scheduling access to multiple disks based on the circumferential position of the heads relative to the disks. Co-pending U.S. patent application Ser. No. 09/301,179 discloses a disk drive which provides head position information to a host computer so that the host microprocessor may execute the scheduling algorithm rather than the disk controller. U.S. Pat. No. 5,787,482 discloses a video server wherein access requests to a plurality of disk drives are scheduled based on an inferred radial position of the head within each disk drive. The radial position of the head is inferred based on commands previously sent to each disk drive. However, using inferred temporal parameters to implement the scheduling algorithm provides sub-optimal performance due to the error inherent in estimation. Further, it is difficult to minimize the variance in latency associated with generating the temporal parameters due to the estimation error as well as the variance in computing the temporal parameters, which further degrades performance of the scheduling algorithm. Consequently, scheduling algorithms based on inferred temporal parameters are sub-optimal with respect to the aggregate performance of a computer network, and particularly the number of input/output operations per second (IOPs) performed by each disk drive connected to the computer network.

There is, therefore, a need to improve upon the prior art techniques of scheduling access to a plurality of storage systems, such as a plurality of disk storage devices, connected to a computer network. In particular, there is a need to schedule access to a plurality of disk storage devices connected to a computer network in a manner which minimizes the variance in latency associated with generating the temporal parameters, thereby improving the computer network's aggregate performance.

SUMMARY OF THE INVENTION

The present invention may be regarded as a network switch for resolving requests from a plurality of host initiators by scheduling access to a plurality of disk storage devices. The network switch comprises a switched fabric comprising a plurality of switching elements. Each switching element comprises a plurality of bi-directional switched fabric ports, and a control input connected to receive switch control data for selectively configuring the switching element in order to interconnect the bi-directional switched fabric ports. The network switch further comprises a memory for storing a routing and scheduling program, and a microprocessor, responsive to the requests, for executing the steps of the routing and scheduling program to generate the switch control data to transmit scheduled requests through the bi-directional switched fabric ports. At least one of the plurality of switching elements comprises a disk storage interface for connecting to a selected one of the disk storage devices. The microprocessor schedules access to the plurality of disk storage devices through the disk storage interface. The disk storage interface receives scheduling data from the selected one of the storage devices, and the memory stores the scheduling data received via the bi-directional switched fabric ports of a selected number of the switching elements. The scheduling data is processed according to a priority such that the selected switching elements transfer the scheduling data through the bi-directional switched fabric ports before transferring data associated with the scheduled requests.

In one embodiment, at least one switching element further comprise a disk storage device connected to the disk storage interface. In another embodiment, the switching elements further comprise a plurality of virtual lanes, wherein at least one of the virtual lanes is reserved for transferring data associated with the scheduled requests, at least one of the virtual lanes is reserved for transferring the scheduling data, and the virtual lane for transferring the scheduling data comprises a higher priority than the virtual lane for transferring the data associated with the scheduled requests.

The present invention may also be regarded as a method of resolving requests from a plurality of host initiators by scheduling access to a plurality of disk storage devices connected to a network switch, the network switch comprising a switched fabric comprising a plurality of switching elements. The method comprises the steps of transmitting through the switching elements scheduling data from the plurality of disk storage devices to a memory, evaluating the scheduling data in order to schedule the requests from the host initiators, and transmitting data associated with the scheduled requests through the switching elements to the plurality of disk storage devices. The scheduling data is processed according to a priority such that the switching elements transfer the scheduling data before transferring data associated with the scheduled requests.

DESCRIPTION OF THE PREFERRED EMBODIMENTS

Figure 1:
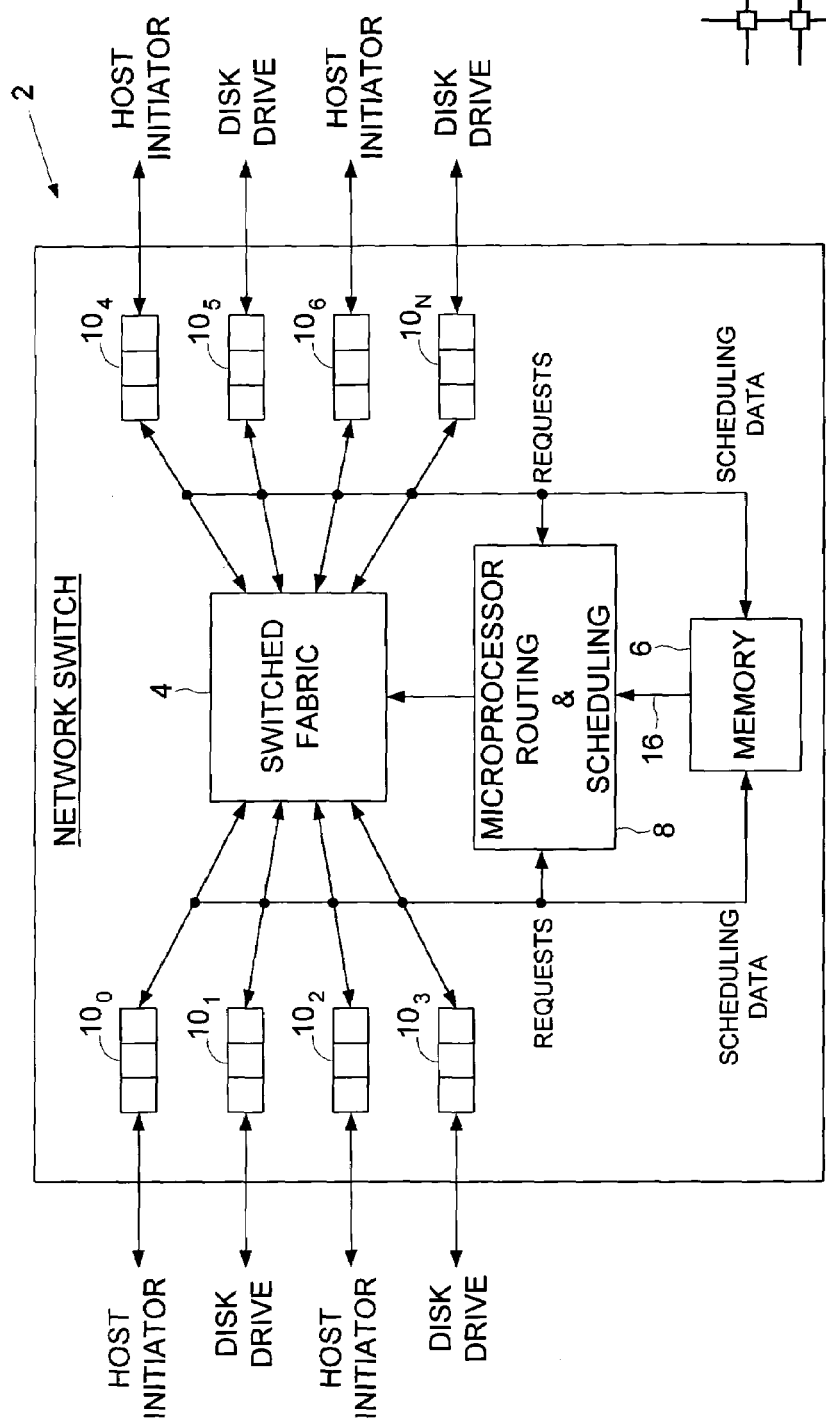
FIG. 1 shows a network switch according to an embodiment of the present invention comprising a switched fabric having a plurality of switching elements, a microprocessor for executing a routing and scheduling algorithm, and a memory for storing scheduling data received from a plurality of disk storage devices.

FIG. 1 shows a network switch 2 for resolving requests from a plurality of host initiators by scheduling access to a plurality of disk storage devices (DSDs). The network switch 2 comprises a switched fabric 4 comprising a plurality of switching elements. Each switching element comprises a plurality of bi-directional switched fabric ports, and a control input connected to receive switch control data for selectively configuring the switching element in order to interconnect the bi-directional switched fabric ports. The network switch 2 further comprises a memory 6 for storing a routing and scheduling program, and a microprocessor 8, responsive to the requests, for executing the steps of the routing and scheduling program to generate the switch control data to transmit scheduled requests through the bi-directional switched fabric ports. At least one of the plurality of switching elements comprises a disk storage interface for connecting to a selected one of the disk storage devices. The microprocessor 8 schedules access to the plurality of disk storage devices through the disk storage interface. The disk storage interface receives scheduling data from the selected one of the storage devices, and the memory 6 stores the scheduling data received via the bi-directional switched fabric ports of a selected number of the switching elements. The scheduling data is processed according to a priority such that the selected switching elements transfer the scheduling data through the bi-directional switched fabric ports before transferring data associated with the scheduled requests.

The microprocessor 8 in the network switch 2 executes a conventional routing algorithm for routing requests (messages) between the nodes in the network (e.g., host initiators, storage devices, etc.). The network switch 2 comprises buffers $10_0$–$10_N$ which buffer the requests before and after the requests are transmitted through the switched fabric 4. In one embodiment, a request consists of a packet having a packet header comprising routing data which identifies the destination node for the packet. The microprocessor 8 processes the packet header in order to route the packet through the switched fabric 4. A suitable routing algorithm implemented by the microprocessor 8 generates control data for configuring the switching elements within the switched fabric 4. Any suitable routing algorithm may be implemented by the network switch 2, and it may support Unicast or Multicast Routing. The routing decisions may be made centrally, at the source, distributed, or multiphase, implemented using a lookup table or using a finite-state machine. Further, the routing algorithm may be deterministic or adaptive. A discussion of various routing algorithms which may be employed in the embodiments of the present invention is provided by Jose Duato et al. in the text book "*Interconnection Networks, an Engineering Approach*", IEEE Computer Society, 1997.

Figure 2:
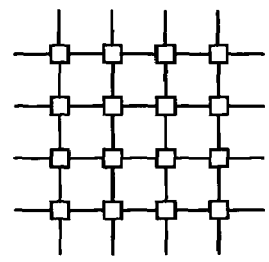
FIG. 2 shows an example topology for the switched fabric of FIG. 1 wherein the plurality of multi-port switches form a multi-dimensional switched fabric.

The routing algorithm is implemented a layer "above" the switching layer, and thus the routing algorithm may be compatible with various different switching algorithms, for example, Virtual Cut-Through Switching, Wormhole Switching, and Mad Postman Switching. The switching layer is implemented by the switched fabric 4 using a plurality of multi-port switching elements. FIG. 2 illustrates an example topology for the switching elements: a two dimensional switched fabric which allows any node in the network to communicate with any other node so that many nodes can communicate simultaneously without contention. In an alternative embodiment, the switching elements are configured to form a plurality of switch stages, wherein each individual switch stage is a multi-dimensional switched fabric, and the number of switch stages and connection patterns between switch stages determines the routing capability of the network switch 2. In the two dimensional switched fabric of FIG. 2, each switching element comprises up to four ports (North, South, East and West); however, switching elements comprising fewer or more ports may also be employed. Various topologies and switching algorithms which may be employed in the embodiments of the present invention are discussed in the aforementioned text book by Jose Duato et al.

Figure 3:
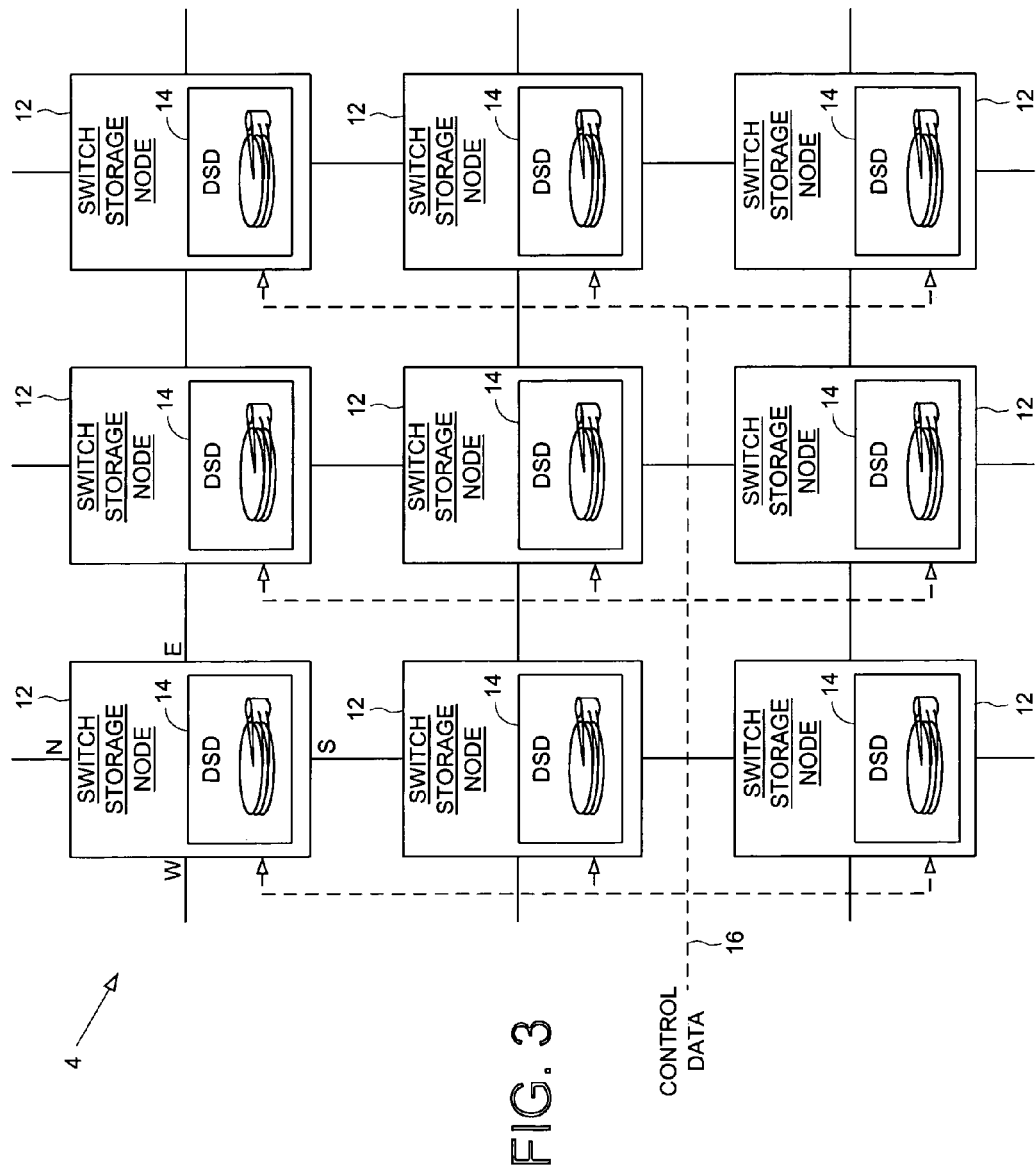
FIG. 3 shows an embodiment of the present invention wherein each switching element in the switched fabric of FIG. 2 comprises a disk storage device (DSD) to form a switch storage node.

FIG. 3 shows an embodiment of the present invention wherein each switching element in the switched fabric 4 of FIG. 1 is implemented as a switch storage node 12 comprising a local disk storage device (DSD) 14. Each DSD 14 comprises at least one disk for storing data, and a corresponding head actuated radially over the disk for writing data to and reading data from the disk. In the embodiment of FIG. 3, each storage node comprises four bi-directional ports (N,E,S,W) which interconnect with other switch storage nodes 12 to form the two dimensional switched fabric of FIG. 2. The dimensions in the switched fabric can be increased by increasing the number of ports at each storage node. For example, a three dimensional switched fabric comprises storage nodes having six bi-directional ports. Control data 16 generated by the microprocessor 8 of FIG. 1 configures each switch storage node 12 in order to implement the routing and scheduling algorithm. In one embodiment, the switched fabric of FIG. 3 implements a distributed file system wherein file data is mirrored on multiple DSDs 14 to enhance performance. The host initiators of FIG. 1 request access to specific files, and the microprocessor 8 evaluates the requests in view of the current state of the switched fabric 4 to determine the most appropriate path and DSD 14 to service the requests. To this end, the DSDs 14 in each switch storage node 12 of FIG. 3 periodically transfer scheduling data autonomously to the memory 6 of FIG. 1 for use by the microprocessor 8 in routing and scheduling the requests received from the host initiators.

Figure 4:
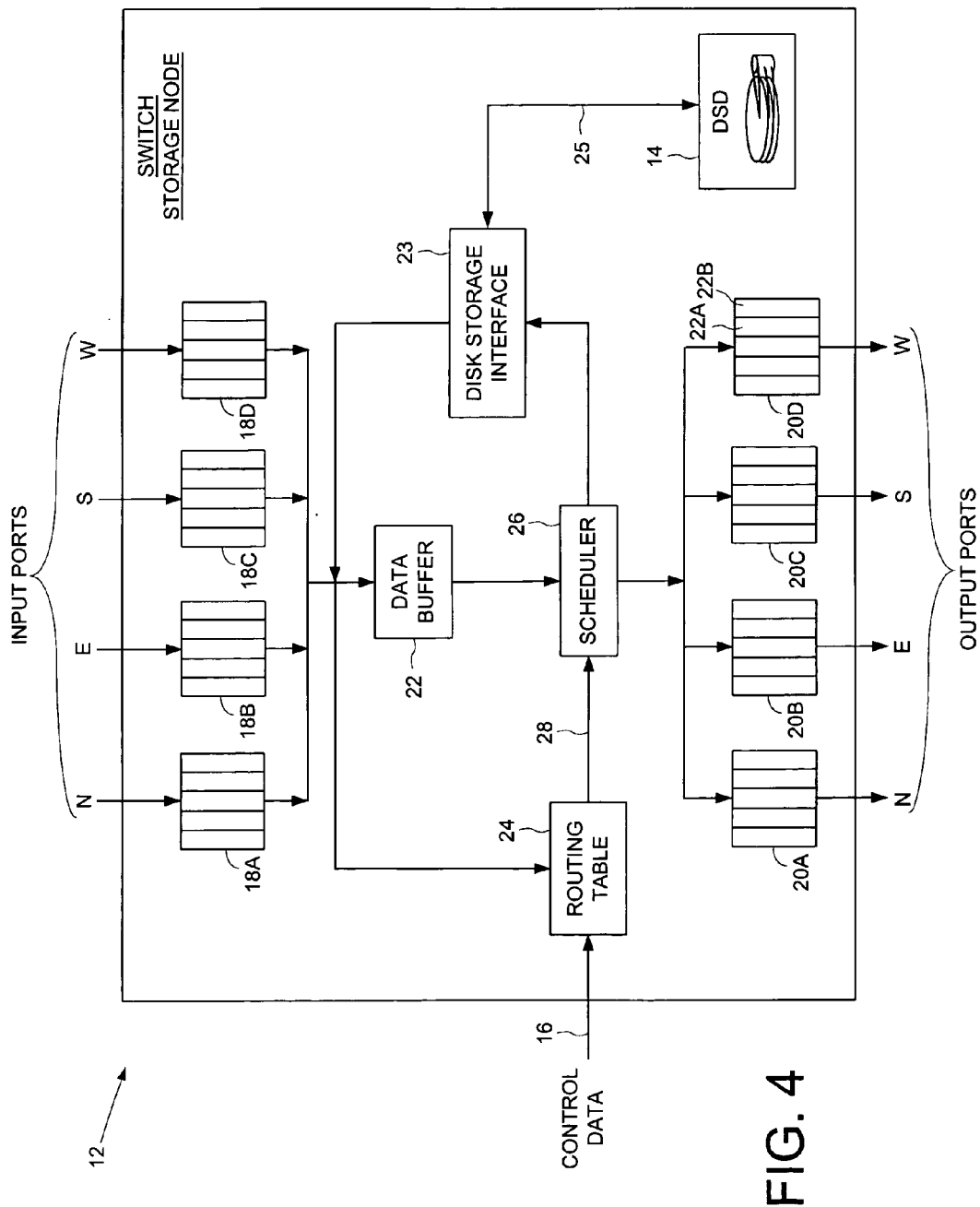
FIG. 4 illustrates details of a switch storage node for use in the embodiment of FIG. 3.

FIG. 4 shows details of a switch storage node 12 according to one embodiment of the present invention for use in the switched fabric 4 of FIG. 3. Each port (N,E,S,W) in FIG. 4 comprises an input port (18A–18D) and an output port (20A–20D) which facilitates the bi-directional aspect of each port. Data is received into the switch storage node 12 via the input ports (18A–18D), stored in a data buffer 22, and then routed to a selected output port or ports (20A–20D) at the appropriate time. Header information is extracted from the input data and input into a routing table 24 which comprises the routing information as configured by the control data 16. A scheduler 26 processes the selections 28 made by the routing table 24 in order to transfer the data from the data buffer 22 to the appropriate output port (20A–20D) at the appropriate time. In one embodiment, the switch storage node 12 may support isochronous data wherein the data stored in the data buffer 22 is transferred to the appropriate output port (20A–20D) according to an arrival and deadline time which guarantees a maximum delay time for the data to cross the switch storage node 12.

Each output port (20A–20D) comprises a plurality of virtual lanes or queues (e.g., 22A and 22B) which are prioritized so that the data stored in the virtual lanes having higher priority are transferred over data stored in virtual lanes having lower priority. The prioritized virtual lanes are used to transmit scheduling data associated with the DSD 14 prior to sending data associated with host initiator requests in order to minimize the latency in transmitting the scheduling data to the memory 6 of FIG. 1.

The switched storage node 12 of FIG. 4 comprises disk storage interface circuitry 23 for interfacing with the DSD 14. Data received from the input ports (18A–18D) and destined for storage on the DSD 14 is transmitted via the scheduler 26 through the disk storage interface 23 and written on a disk within the DSD 14. A request to read data stored on the DSD 14 may also be received from the input ports (18A–18D). The request is transferred by the scheduler 26 to the disk storage interface 23 which interfaces with the DSD 14 over line 25 to perform the read operation. The data read from the DSD 14 is configured by the disk storage interface 23 into network data (e.g., network packets) which is injected into the switching circuitry similar to data received from the input ports (18A–18D). The data is staged in the data buffer 22 and header information is transferred to the routing table 24 for use in routing the data to the appropriate output port (20A–20D).

To assist the microprocessor 8 of FIG. 1 with the routing and scheduling of requests received from the host initiators, the DSD 14 in each of the switching nodes 12 periodically and autonomously transfers scheduling data to the memory 6 of FIG. 1. In one embodiment, the scheduling data comprises temporal parameters of the DSD 14 which provide insight into the current state of the DSD 14 and latency associated with storing or retrieving particular data (e.g., a data stream). Examples of temporal data include the radial location of the head within the DSD 14 relative to the disk, as well as the circumferential position of the head relative to the disk.

Figure 5:
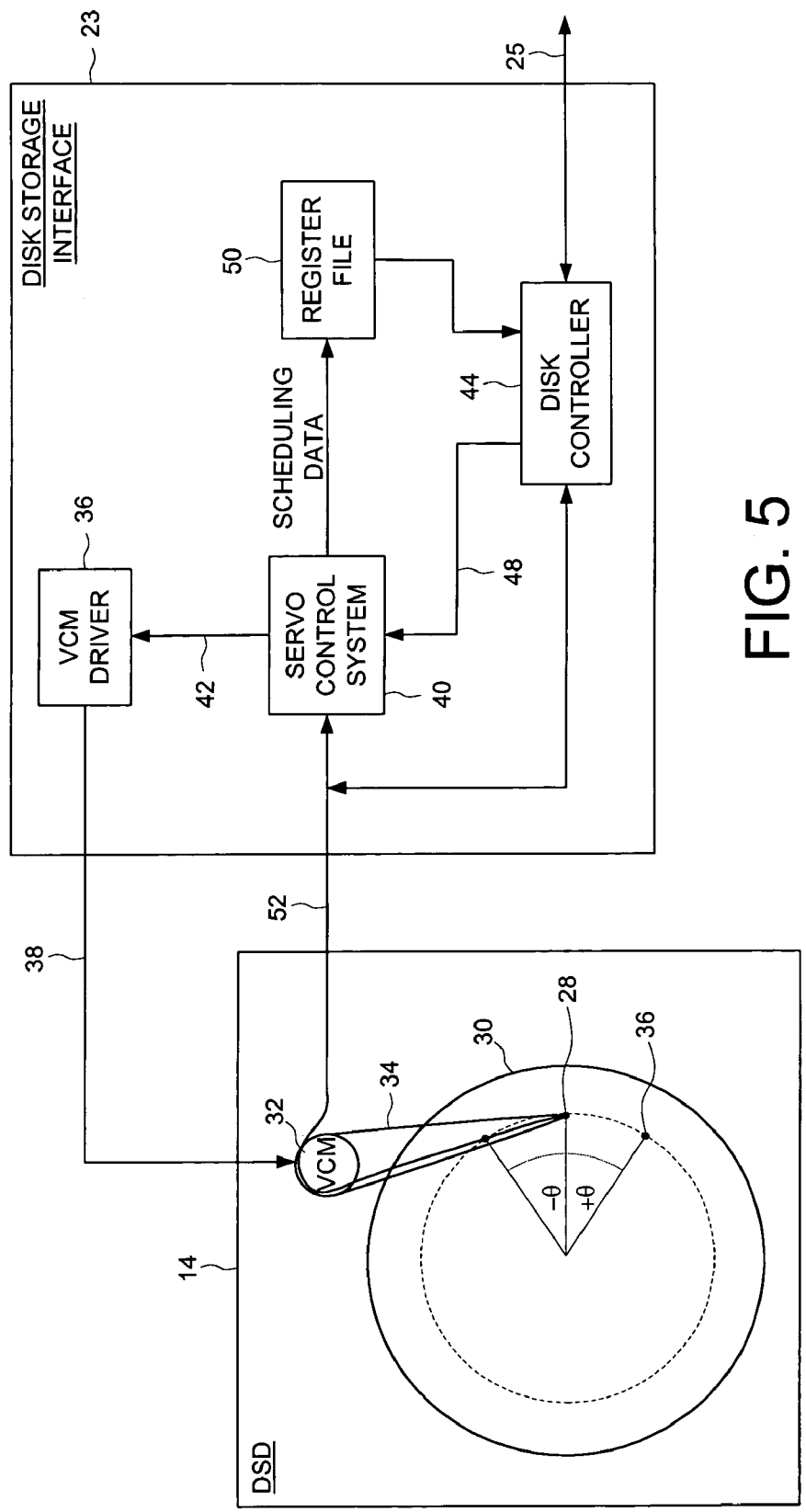
FIG. 5 shows details of the disk storage device (DSD) and disk storage interface circuitry of FIG. 4.

FIG. 5 shows an embodiment of the present invention wherein the DSD 14 comprises components of a conventional head disk assembly (HDA), including a head 28 positioned radially over a disk 30 by a voice coil motor (VCM) 32 which rotates an actuator arm 34 about a pivot. An index mark 36 is recorded on the disk 30 which provides information about the circumferential location of the head 28 relative to the disk 30. The disk storage interface circuitry 23 comprises a VCM driver 36 for generating control signals 38 applied to the VCM 32, and a servo control system 40 for generating control signals 42 applied to the VCM driver 36. A disk controller 44 within the disk storage interface 23 receives requests from the switching circuitry over line 25 to write data to and read data from the disk 30. The disk controller 44 generates control signals 48 applied to the servo control system 40 in order to position the head 28 over a desired radial location of the disk 30.

During a write operation, the disk controller 44 receives a request over line 25 to write data to the disk 30. The disk controller 44 evaluates the request to determine the appropriate radial location on the disk 30 to write the data, and then positions the head 28 over the desired radial location by sending the appropriate control signals 48 to the servo control system 40. The write data is formatted (e.g., encoded using an error correction code (ECC), defect mapped, etc.), and then transmitted over line 52 for writing to the disk 30. During a read operation, the disk controller 44 processes the request received over line 25 by positioning the head 28 over the desired radial location of the disk 30 and reading the data over line 52. The disk controller 44 configures the data read from the disk 30 into network data (e.g., network packets) which is transmitted to the switching circuitry of FIG. 4 over line 25.

A register file 50 is employed in the embodiment of FIG. 5 for storing scheduling data in the form of temporal parameters of the DSD 14. For example, in one embodiment the servo control system 40 stores in the register file 50 the current radial and circumferential location of the head 28 with respect to the disk 30. The radial location of the head 28 is determined from Gray coded track addresses in embedded servo sectors recorded at a regular interval on the disk 30, and the circumferential location of the head 28 is determined relative to when the head 28 reads the index mark 36. At a predetermined periodic interval, the disk controller 44 retrieves the scheduling data from the register file 50, converts the data into network data (e.g., a network packet), and transmits the network data over line 25 to the switching circuitry for transfer to the memory 6 of FIG. 1.

In order to minimize the latency associated with transferring the scheduling data to the memory 6, the scheduling data is transmitted using a virtual lane (e.g., 22A or 22B of FIG. 4) which has a higher priority than regularly scheduled data associated with requests from the host initiators. This ensures the scheduling data will not be delayed in the network by regularly scheduled host initiator data.

In another embodiment, the scheduling data is transferred according to an isochronous protocol to ensure that the scheduling data arrives at the memory 6 within a specified period. This minimizes the variance in the latency associated with transmitting the scheduling data to the memory 6. An example of an isochronous protocol is provided in the reference "FireWire® System Architecture, Second Edition IEEE 1394a", MindShare, Inc., 1999.

In yet another embodiment, a primary network communication protocol is used to communicate with the host initiators in order to transmit host initiator data through the network, and a secondary network communication protocol is used to communicate, at least in part, with the disk storage devices. For example, the primary network communication protocol may implement an asynchronous protocol for communicating host initiator data, and the secondary network communication protocol may implement an isochronous protocol for communicating the drive scheduling data. In another embodiment, different switching techniques may be employed to implement the dual level protocol. For example, the primary network communication protocol may implement wormhole switching in order to communicate long packets associated with host initiator data more efficiently, whereas the secondary network communication protocol may implement packet switching in order to communicate short packets of scheduling data more efficiently. With packet switching, packets are buffered completely within each node before being transferred to the next node which is why this type of switching is referred to as store-and-forward packet switching. With wormhole switching, packets are transmitted immediately to the next node so that packets are pipelined across several nodes. Packet switching ensures a predictable consumption of link and buffer resources which is necessary to support an isochronous communication protocol, whereas wormhole switching reduces the latency and buffer requirements needed to transfer the typically longer packets associated with host initiator data.

Figure 6:
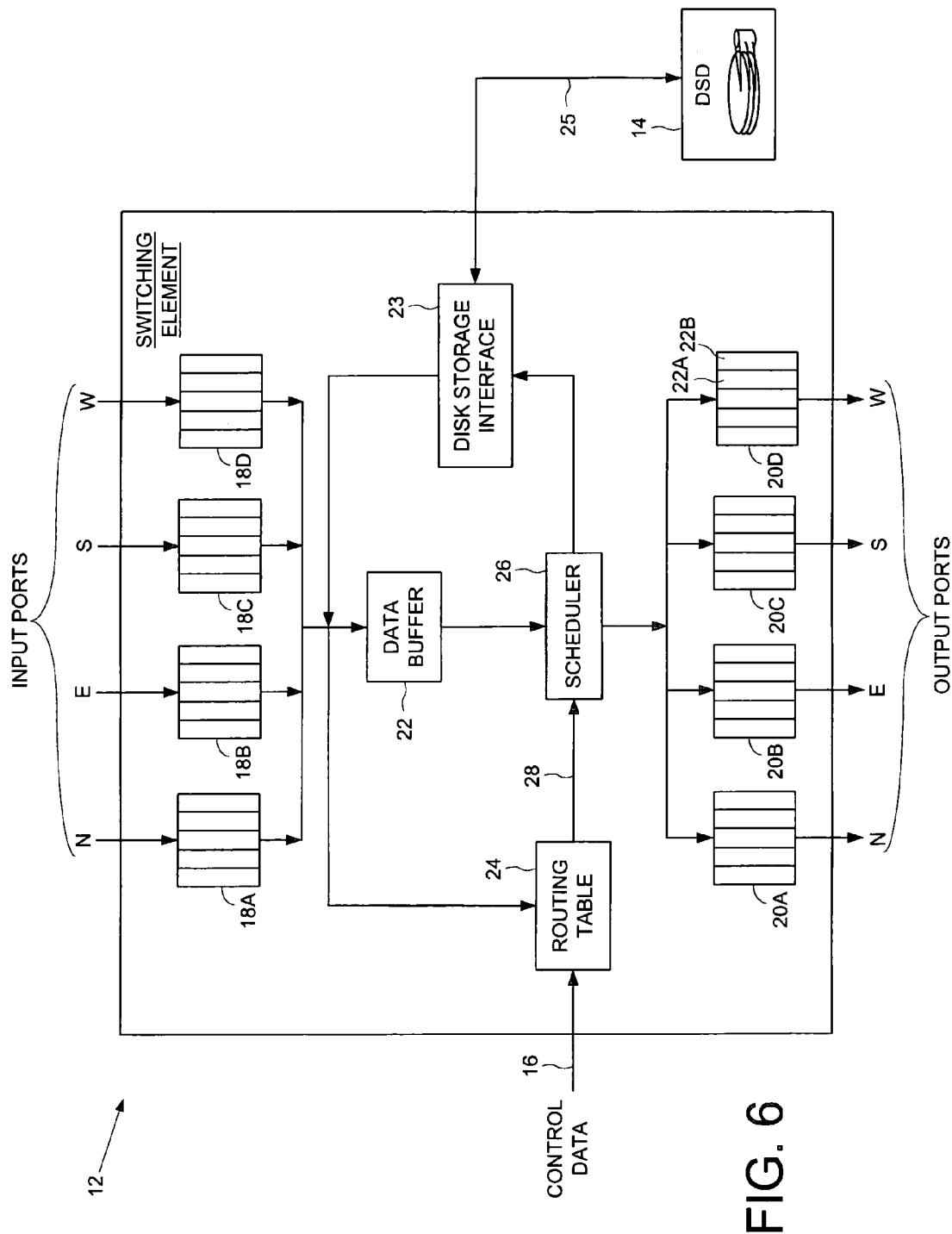
FIG. 6 shows an alternative embodiment of the present invention wherein the disk storage device (DSD) is implemented external to the switching element as a disk drive connected to the switch fabric.

In the embodiment shown in FIG. 4, the disk interface circuitry of FIG. 5 and switching circuitry are integrated into a single integrated circuit (IC) which is mounted on a printed circuit board (PCB) attached to a conventional HDA. In another embodiment illustrated in FIG. 6, the switching circuitry and disk storage interface circuitry are implemented separate from the disk controller 44 and other circuitry shown in FIG. 5. In this embodiment, the disk storage interface circuitry may comprise the facilities for converting between network and DSD data, whereas the disk controller 44 and other circuitry shown in FIG. 5 may be implemented within the DSD 14. For example, the DSD 14 may be implemented as a conventional disk drive modified to collect and transmit scheduling data at a periodic interval. The disk drive may be connected at a node within the switched fabric 4, or it may be connected at the edge of the switched fabric 4 as illustrated in FIG. 1.

I claim:

1. A network switch for resolving requests from a plurality of host initiators by scheduling access to a plurality of disk storage devices, the network switch comprising:
   (a) a switched fabric comprising a plurality of switching elements, each switching element comprising:
      a plurality of bi-directional switched fabric ports; and
      a control input connected to receive switch control data for selectively configuring the switching element in order to interconnect the bi-directional switched fabric ports;
   (b) a memory for storing a routing and scheduling program; and
   (c) a microprocessor, responsive to the requests, for executing the steps of the routing and scheduling program to generate the switch control data to transmit scheduled requests through the bi-directional switched fabric ports, wherein:
      at least one of the plurality of switching elements comprises a disk storage interface for connecting to a selected one of the disk storage devices;
      the microprocessor for scheduling access to the plurality of disk storage devices through the disk storage interface;
      the disk storage interface for receiving scheduling data from the selected one of the disk storage devices;
      the memory for receiving the scheduling data via the bi-directional switched fabric ports of a selected number of the switching elements;
      the scheduling data is processed according to a priority such that the selected switching elements transfer the scheduling data through the bi-directional switched fabric ports before transferring data associated with the scheduled requests;
      each disk storage device comprises a disk and a head; and
      the scheduling data comprises a radial location of the head relative to the disk within each disk storage device.

2. The network switch as recited in claim 1, wherein the at least one switching element further comprises a disk storage device connected to the disk storage interface.

3. The network switch as recited in claim 1, wherein the scheduling data further comprises a circumferential location of the head relative to the disk within each disk drive.

4. The network switch as recited in claim 1, wherein the switching elements further comprise a plurality of virtual lanes, wherein:
   (a) at least one of the virtual lanes is reserved for transferring data associated with the scheduled requests;
   (b) at least one of the virtual lanes is reserved for transferring the scheduling data; and
   (c) the virtual lane for transferring the scheduling data comprises a higher priority than the virtual lane for transferring the data associated with the scheduled requests.

5. The network switch as recited in claim 1, wherein the scheduling data is communicated to the memory through the bi-directional switched fabric ports according to an isochronous protocol.

6. A method of resolving requests from a plurality of host initiators by scheduling access to a plurality of disk storage devices connected to a network switch, the network switch comprising a switched fabric comprising a plurality of switching elements, the method comprising the steps of:
   (a) transmitting through the switching elements scheduling data from the plurality of disk storage devices to a memory;
   (b) evaluating the scheduling data in order to schedule the requests from the host initiators; and
   (c) transmitting data associated with the scheduled requests through the switching elements to the plurality of disk storage devices, wherein:
      the scheduling data is processed according to a priority such that the switching elements transfer the scheduling data before transferring data associated with the scheduled requests;
      each disk storage device comprises a disk and a head; and
      the scheduling data comprises a radial location of the head relative to the disk within each disk storage device.

7. The method as recited in claim 6, wherein the scheduling data further comprises a circumferential location of the head relative to the disk within each disk drive.

8. The method as recited in claim 6, wherein the switching elements further comprise a plurality of virtual lanes, wherein:
   (a) at least one of the virtual lanes is reserved for transferring data associated with the scheduled requests;
   (b) at least one of the virtual lanes is reserved for transferring the scheduling data; and
   (c) the virtual lane for transferring the scheduling data comprises a higher priority than the virtual lane for transferring the data associated with the scheduled requests.

9. The method as recited in claim 6, wherein the scheduling data is communicated to the memory through the switching elements according to an isochronous protocol.

* * * * *